(12) United States Patent
Ike et al.

(10) Patent No.: US 10,434,950 B2
(45) Date of Patent: Oct. 8, 2019

(54) DOUBLE OPENING STORAGE DEVICE

(71) Applicant: TOYODA GOSEI CO., LTD., Kiyosu-shi (JP)

(72) Inventors: Yasufumi Ike, Nagoya (JP); Yu Hishida, Kiyosu (JP); Yoshinori Noda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/045,011

(22) Filed: Jul. 25, 2018

(65) Prior Publication Data

US 2019/0077322 A1  Mar. 14, 2019

(30) Foreign Application Priority Data

Sep. 8, 2017  (JP) .................................. 2017-173570

(51) Int. Cl.
*B60R 7/04* (2006.01)
*E05B 83/32* (2014.01)
*B60N 2/75* (2018.01)

(52) U.S. Cl.
CPC ................ *B60R 7/04* (2013.01); *B60N 2/793* (2018.02); *E05B 83/32* (2013.01)

(58) Field of Classification Search
CPC ............ B60R 7/04; B60N 2/793; E05B 83/32
USPC ............................................. 296/37.8, 24.34
See application file for complete search history.

(56) References Cited

U.S. PATENT DOCUMENTS

| 6,142,333 | A | * | 11/2000 | Sasamoto | ................. B60R 7/04 220/264 |
| 8,100,453 | B2 | | 1/2012 | Shimajiri | |
| 9,637,060 | B2 | * | 5/2017 | Gaudig | ..................... B60R 7/06 |
| 10,099,824 | B2 | * | 10/2018 | Masatsugu | ................ B60R 7/04 |
| 2016/0114732 | A1 | | 4/2016 | Sawada et al. | |

FOREIGN PATENT DOCUMENTS

JP      2016-007865 A    1/2016

* cited by examiner

*Primary Examiner* — Joseph D. Pape
(74) *Attorney, Agent, or Firm* — Posz Law Group, PLC

(57) ABSTRACT

A double opening storage device includes two opening and closing mechanisms that open and close a lid leftward and rightward relative to a box body. Each opening and closing mechanism include: a shaft member disposed so as to be coaxial with a rotation shaft; a support member that supports the shaft member so as to rotate the shaft member; an urging member that generates urging force for rotating the shaft member relative to the support member in an opening direction; and a locking device that holds the lid in a closed state against the urging force, and cancels, by an opening operation, holding of the lid. The shaft member and the support member include opposing surfaces, respectively, which are spaced from each other in the lid closed state, and projections, respectively, which interfere with each other while the lid is shifting from the closed state to a predetermined opened state.

4 Claims, 12 Drawing Sheets

DOUBLE OPENING STORAGE DEVICE

TECHNICAL FIELD

The present invention relates to a double opening storage device which includes a box body that has a storage portion having an opening, a lid that covers the opening so as to be openable and closable, and an opening and closing mechanism that opens and closes the lid by pivoting the lid about two rotation shafts.

BACKGROUND ART

To date, a double opening storage device such as a console box disposed in a vehicle interior has been known (for example, JP2016007865 (A)). The double opening storage device includes a box body, a lid, and an opening and closing mechanism. The box body has a storage portion which is shaped in an almost rectangular parallelepiped and has an opening in the upper surface. The lid is a member that is formed in a thin rectangular shape so as to correspond to the opening of the box body, and that covers the opening so as to be openable and closable. The opening and closing mechanism includes a right side opening and closing mechanism that opens and closes the lid by pivoting the lid about a first rotation shaft that extends along a left side peripheral edge of the opening of the box body, a left side opening and closing mechanism that opens and closes the lid by pivoting the lid about a second rotation shaft that extends along a right side peripheral edge of the opening of the box body, and an arm member that intervenes between the box body and the lid. The arm member has one end portion supported by the lid so as to be swingable. The arm member has the other end portion supported by the box body so as to be swingable.

The right side opening and closing mechanism and the left side opening and closing mechanism each have: a shaft member disposed so as to be coaxial with the rotation shaft; a support member that supports the shaft member so as to rotate the shaft member about the rotation shaft; an urging member that generates an urging force for rotating the shaft member relative to the support member in the lid opening direction; and a locking device that holds the lid in a closed state against the urging force of the urging member. The shaft member is fixed to the arm member. The support member is disposed in the box body or the lid. One end portion of the urging member is fixed to the shaft member. The other end portion of the urging member is fixed to the box body or the lid. When holding of the lid in the closed state by the locking device is canceled, the opening and closing mechanisms rotate the shaft member relative to the support member in the lid opening direction due to an urging force of the urging member, whereby the lid is opened by pivoting about the first rotation shaft or the second rotation shaft.

Furthermore, the right side opening and closing mechanism and the left side opening and closing mechanism each include a damper device. The damper device is fixed to the box body or the lid. The damper device is a device in which viscous oil is sealed. A damper gear is formed on the outer circumferential portion of the damper device. The damper gear meshes with a gear formed on the outer circumferential portion of the shaft member. The damper device attenuates a lid opening speed by adjusting a rotation speed of rotation of the shaft member relative to the support member when an operation of opening the lid is performed.

SUMMARY OF INVENTION

Technical Problem

An operation of opening a lid is performed by the shaft member being rotated relative to the support member due to an urging force of the urging member, and the lid opening speed is adjusted by an attenuating force from the damper device as described above. In this structure, in a case where the rotation of the shaft member is stopped due to balance between the weight of the lid and the urging force of the urging member, and the lid is held in the opened state at the balanced position, the rotation of the shaft member is not stable due to the urging force of the urging member, and the lid is likely to vibrate around the rotation shaft in the opening and closing direction. Once the lid has been held in the opened state, when an external force is unintentionally applied to the lid due to, for example, vibration of a vehicle body, the above-described balance is likely to be lost, and the shaft member and the support member may rotate relative to each other to vibrate the lid around the rotation shaft in the opening and closing direction. Therefore, in the above-described structure, the lid in the opened state is not stably held.

The present invention has been made in view of such problems, and an object of the present invention is to provide a double opening storage device capable of stably holding a lid in an opened state.

Solution to Problem

The present invention is directed to a double opening storage device that includes: a box body including a storage portion having an opening; a lid configured to cover the opening so as to be openable and closable; a first opening and closing mechanism configured to open and close the lid by pivoting the lid about a first rotation shaft that extends along a peripheral edge of the opening; and a second opening and closing mechanism configured to open and close the lid by pivoting the lid about a second rotation shaft that extends along the peripheral edge of the opening. Each of the first opening and closing mechanism and the second opening and closing mechanism includes: a shaft member disposed so as to be coaxial with the first rotation shaft or the second rotation shaft; a support member configured to support the shaft member so as to rotate the shaft member about the first rotation shaft or the second rotation shaft; an urging member configured to generate an urging force for rotating the shaft member relative to the support member in a direction in which the lid is opened; and a locking device configured to hold the lid in a closed state against the urging force, and cancel, by an opening operation, holding of the lid in the closed state. The shaft member and the support member include opposing surfaces, respectively, which are spaced from each other when the lid is in the closed state, and projections, respectively, which are disposed on the opposing surfaces and project so as to be close to each other. The projection of the shaft member and the projection of the support member do not interfere with each other when the lid is in the closed state, and interfere with each other while the lid is shifting from the closed state to a predetermined opened state.

In this configuration, the projection of the shaft member and the projection of the support member interfere with each other while the lid is shifting from the closed state to a predetermine opened state, whereby the lid is held in the opened state by using friction due to interference between the projection of the shaft member and the projection of the support member. In this structure, when the lid is held in a predetermined opened state, or after the lid has been held in a predetermined opened state, the friction acts such that the shaft member and the support member are less likely to rotate relative to each other, whereby the lid is continuously held in the opened state. Therefore, when an operation of opening the lid is performed, or when the lid is in an opened state, the lid is inhibited from vibrating in the opening and closing direction around the first or the second rotation shaft due to influence of the urging member, whereby the lid is stably held in the opened state.

DESCRIPTION OF EMBODIMENTS

Hereinafter, a specific embodiment of a double opening storage device according to the present invention will be described with reference to the drawings.

A double opening storage device 1 according to one embodiment will be described with reference to FIG. 1 to FIG. 11.

Figure 1:
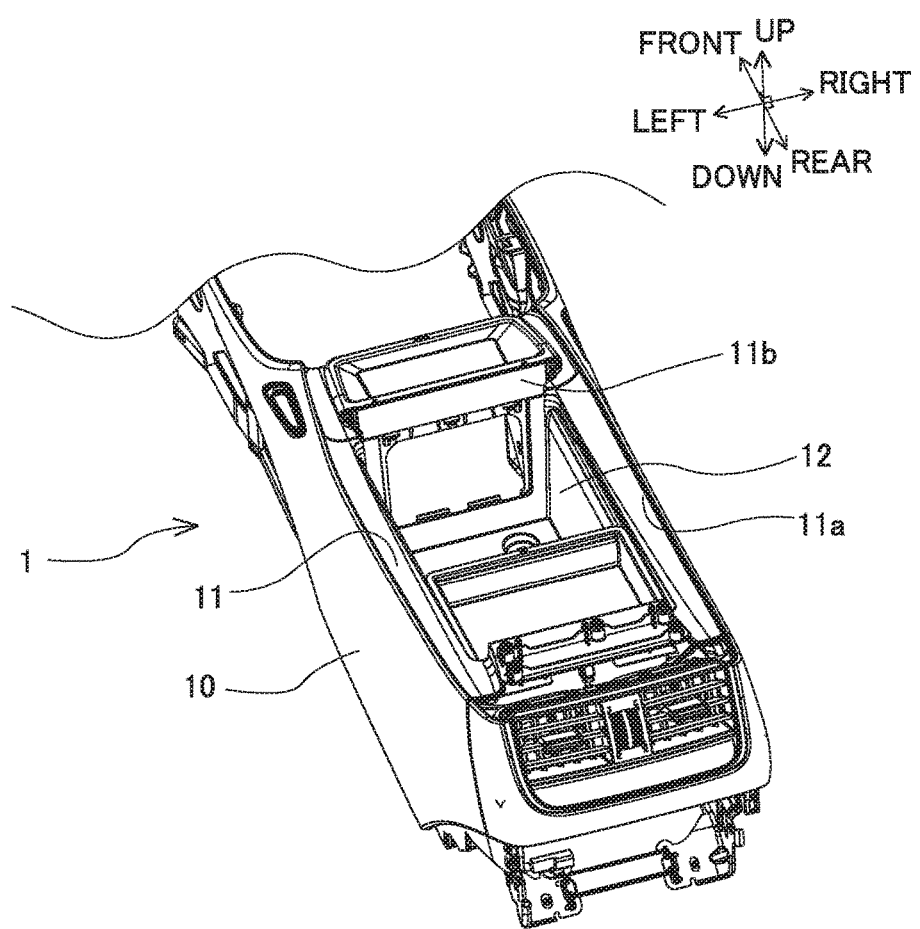
FIG. 1 is a perspective view of a box body of a double opening storage device according to one embodiment of the present invention.
Figure 2:
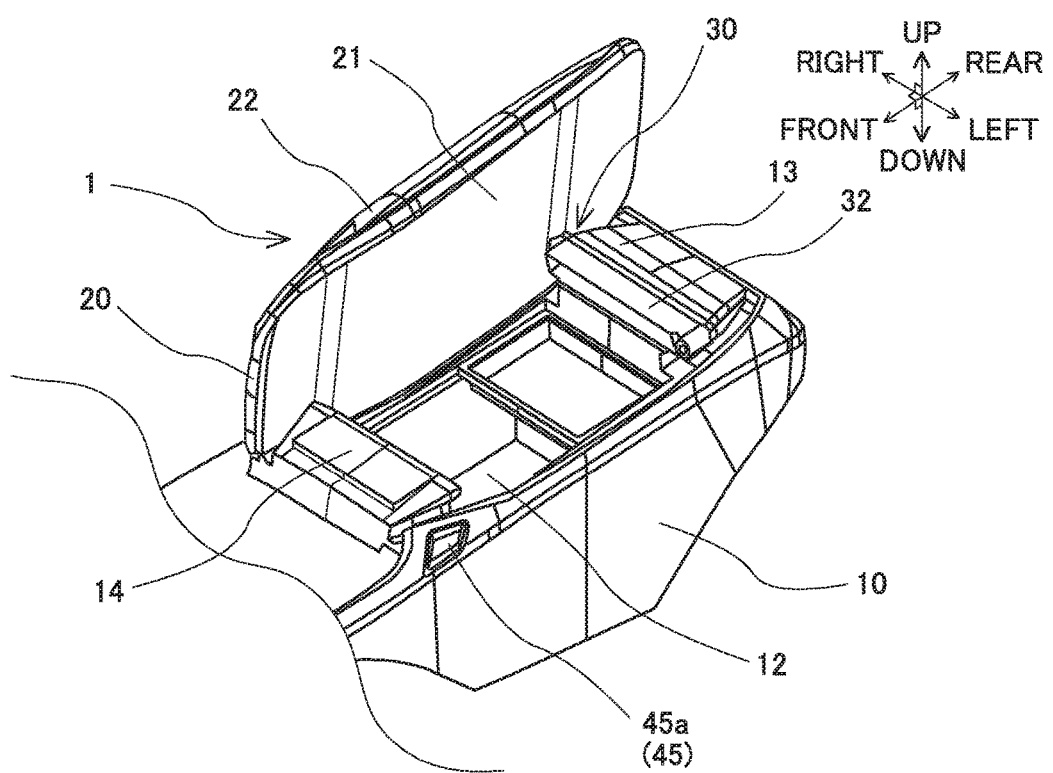
FIG. 2 is a perspective view of a lid, in a left side opened state, of the double opening storage device according to the present embodiment.
Figure 3:
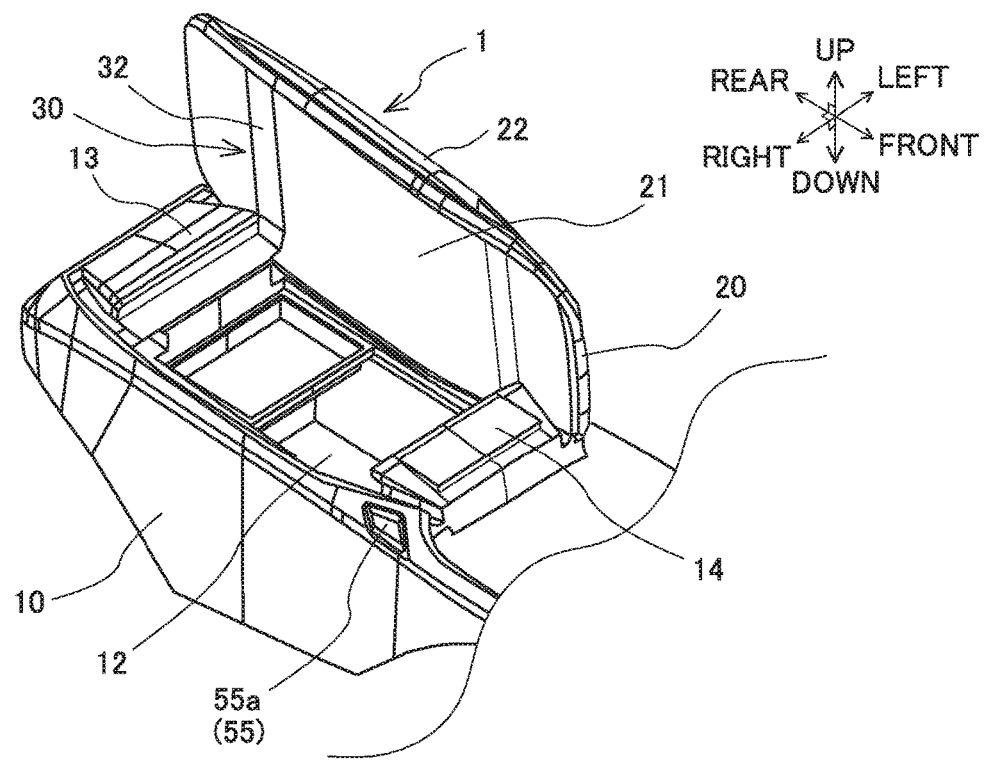
FIG. 3 is a perspective view of the lid, in a right side opened state, of the double opening storage device according to the present embodiment.

The double opening storage device 1 is, for example, a console box mounted to a center console disposed in a vehicle interior, as shown in FIG. 1. The double opening storage device 1 includes a box body 10, a lid 20, and an opening and closing mechanism 30, as shown in FIG. 2 and FIG. 3. The double opening storage device 1 is structured such that the lid 20 is openable and closable relative to the box body 10 by the opening and closing mechanism 30. The double opening storage device 1 may be used as an arm rest on which an arm of a person in the vehicle is placed when the lid 20 is at a closed position. In the present embodiment, the direction is described based on a vehicle in which the double opening storage device 1 is mounted. For example, "right side" represents the right side of the vehicle in the vehicle forward-traveling direction. "Left side" represents the left side of the vehicle in the vehicle forward-traveling direction.

The box body 10 is formed in an almost box shape. The box body 10 includes a storage portion 12. The storage portion 12 has an opening 11 in the upper surface and is shaped in an almost rectangular-parallelepiped. The box body 10 may be any box body that has a side wall and a bottom wall that surround the storage portion 12, and may include, for example, a frame for accommodating a cup holder. The peripheral edge of the opening 11 includes two long sides 11a and two short sides 11b. The long sides 11a extend in the front-rear direction of the vehicle. The short sides 11b extend in the direction orthogonal to the long sides 11a, that is, in the left-right direction of the vehicle. That is, the double opening storage device 1 is disposed such that the long sides 11a extend in the front-rear direction of the vehicle, and the short sides 11b extend in the left-right direction of the vehicle.

The lid 20 is formed in a thin rectangular shape so as to correspond to the opening 11 of the box body 10. The lid 20 covers the opening 11 so as to be openable and closable. The lid 20 is openable and closable by pivoting about a rotation shaft (hereinafter, referred to as first rotation shaft) that extends along the left-side long side 11a of the peripheral edge of the opening 11, from the closed position at which the opening 11 is covered, and pivoting about the rotation shaft (hereinafter, referred to as second rotation shaft) that extends along the right-side long side 11a of the peripheral edge of the opening 11, from the closed position at which the opening 11 is covered. The lid 20 is openable, relative to the box body 10, from both the left side and the right side closed positions to a fully-opened position, at a predetermined angle (for example,) 100°.

The lid 20 includes a lower lid member 21 and an upper lid member 22. The lower lid member 21 has a planar portion formed in a rectangular-plate-like shape, and a side wall portion that surrounds the peripheral edge of the planar portion. The upper lid member 22 is formed in a rectangular shape so as to correspond to the lower lid member 21, and has a rounded shape as its outer appearance. The upper lid member 22 covers the upper surface of the lower lid member 21. The lower lid member 21 and the upper lid member 22 are integrated with each other by, for example, projection and recess fitting, to form the lid 20.

Figure 4:
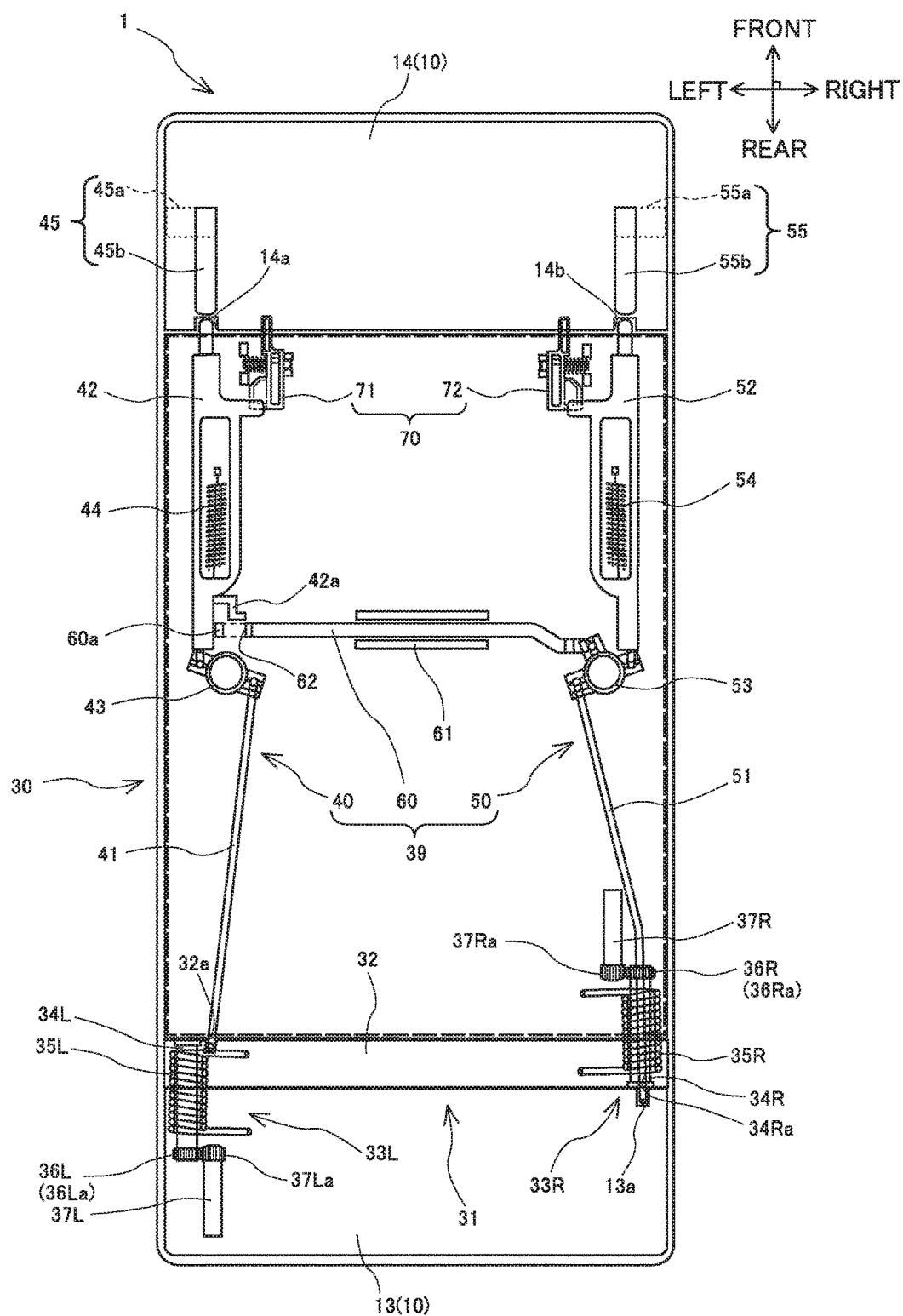
FIG. 4 illustrates a structure of an opening and closing mechanism of the double opening storage device according to the present embodiment.
Figure 5:
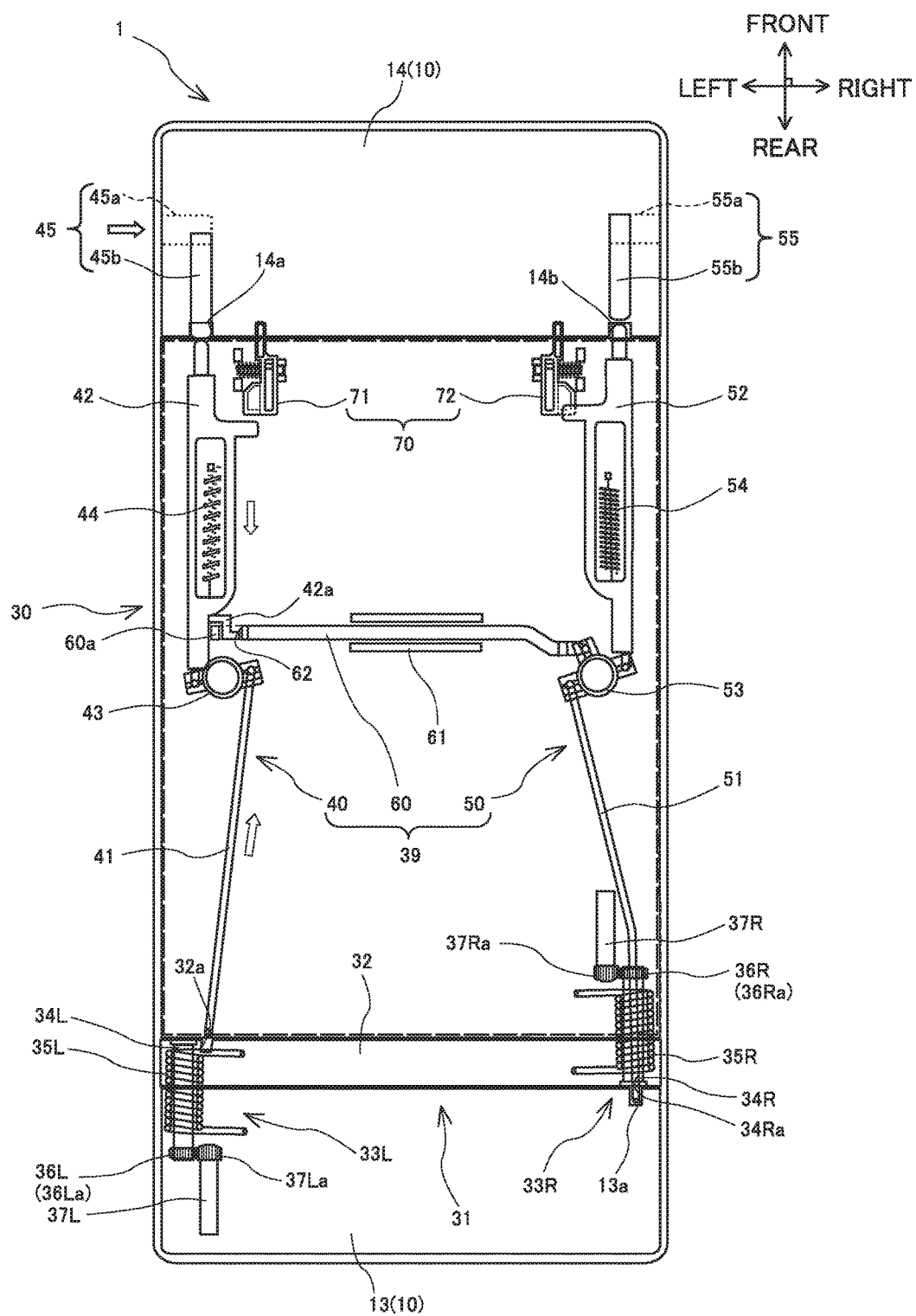
FIG. 5 illustrates a structure, in the left side opened state of the lid, of the opening and closing mechanism of the double opening storage device according to the present embodiment.
Figure 6:
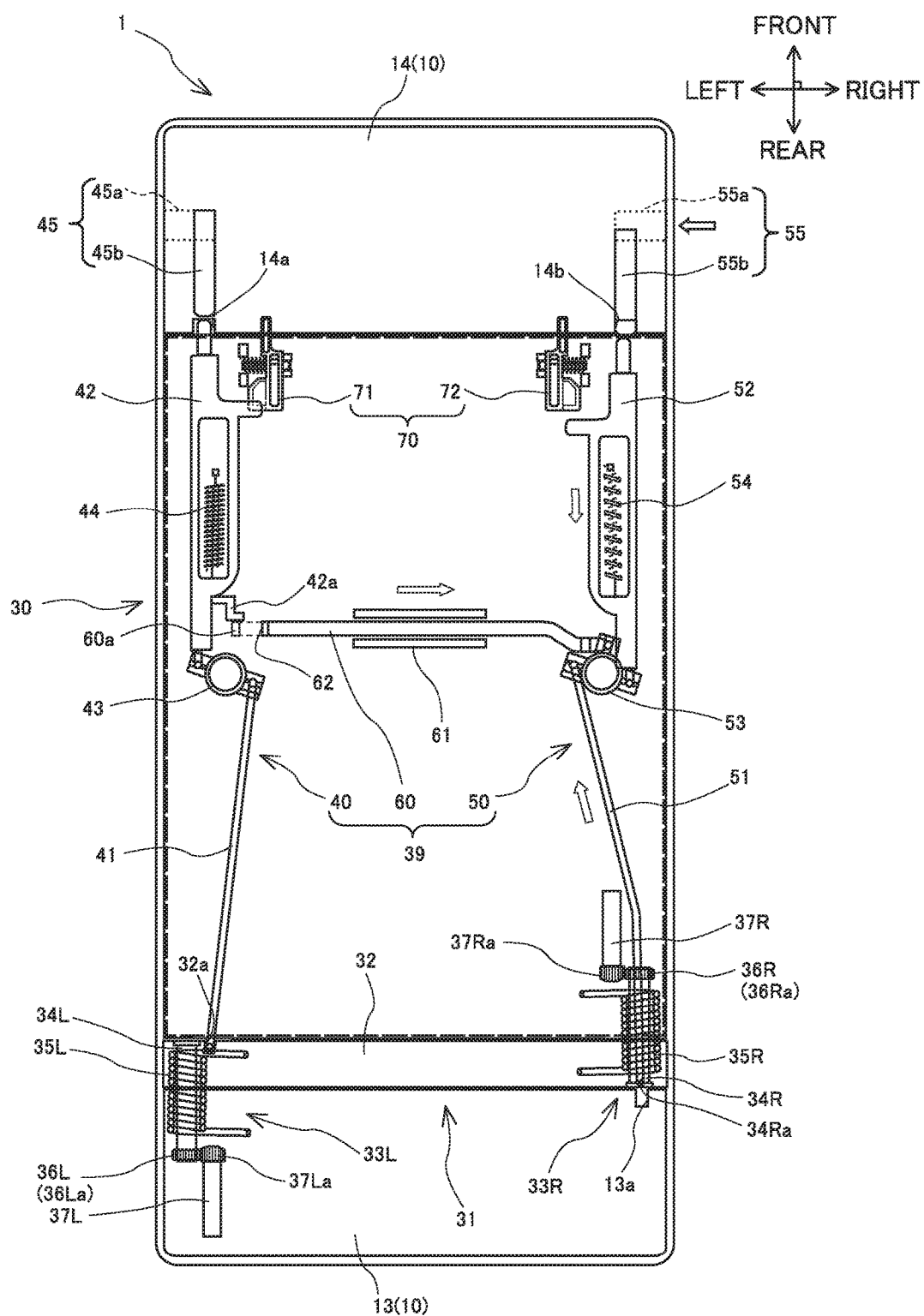
FIG. 6 illustrates a structure, in the right side opened state of the lid, of the opening and closing mechanism of the double opening storage device according to the present embodiment.

The opening and closing mechanism 30 has an arm unit 31 as shown in FIG. 4, FIG. 5, and FIG. 6. In a state where one of the first rotation shaft that extends along the left-side long side 11a and the second rotation shaft that extends along the right-side long side 11a is selected, the arm unit 31 opens and closes the lid 20 by pivoting the lid 20 about the rotation shaft.

Figure 7:
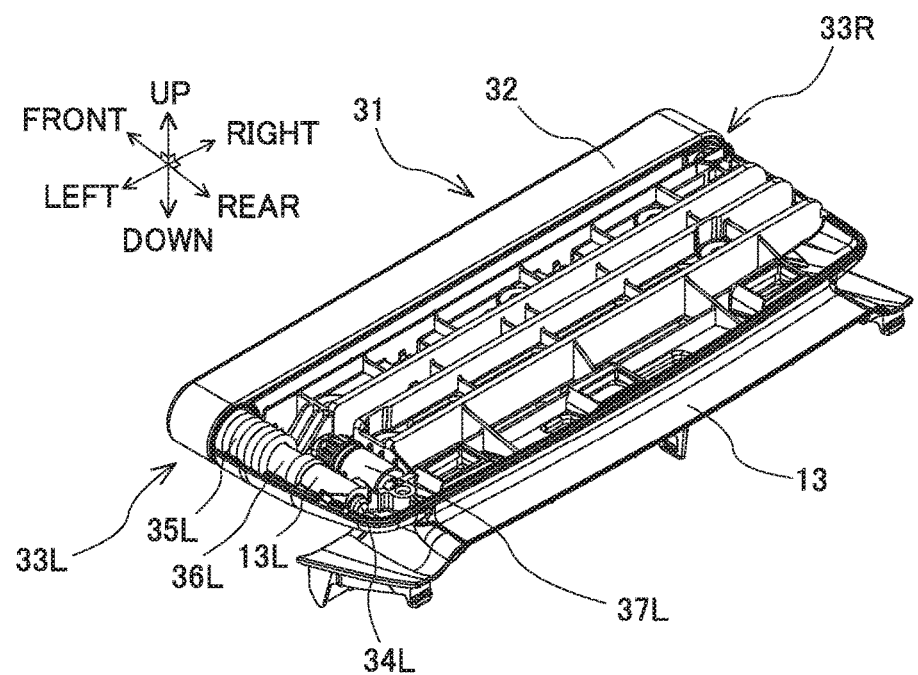
FIG. 7 is a perspective view of an arm unit of the opening and closing mechanism of the double opening storage device according to the present embodiment.
Figure 8:
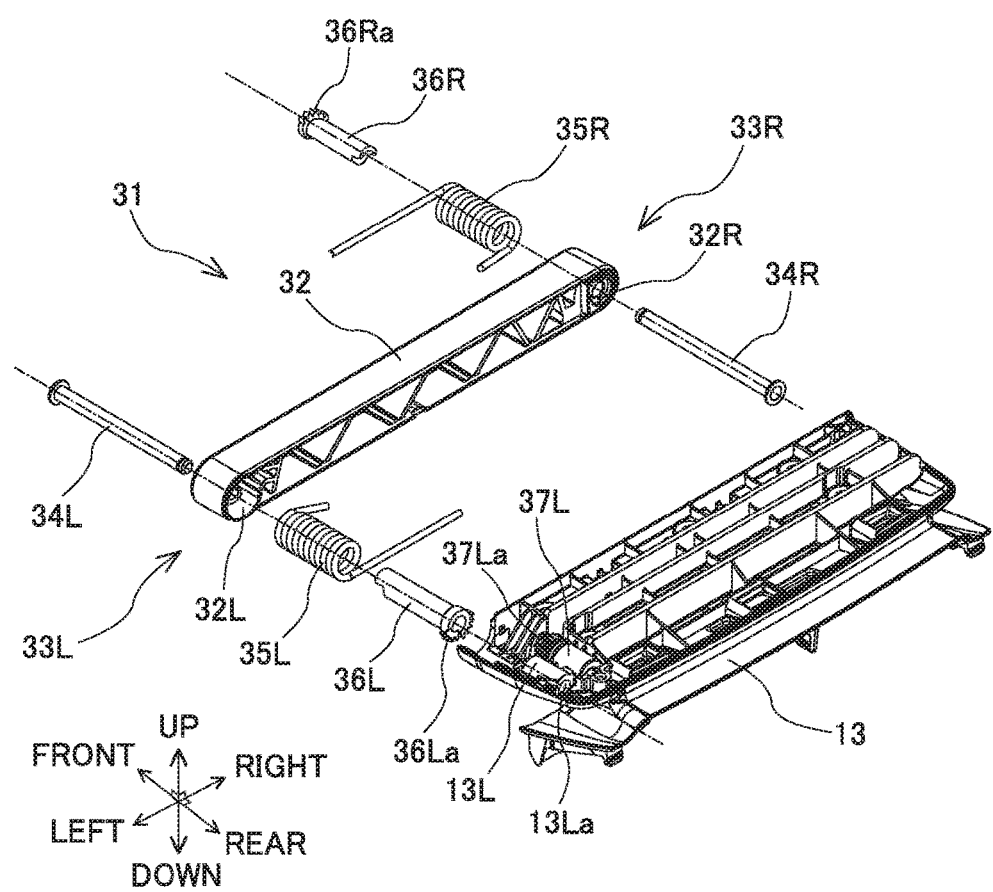
FIG. 8 is an exploded perspective view of the arm unit of the opening and closing mechanism of the double opening storage device according to the present embodiment.

The arm unit 31 has an arm member 32, a left side pivotal-support portion 33L, and a right side pivotal-support portion 33R, as shown in FIG. 7 and FIG. 8. The arm member 32 is an arm-shaped plate member that is formed in a long shape. The arm member 32 is disposed such that the longitudinal direction of the arm member 32 extends in the vehicle left-right direction when the lid 20 is at the closed position. The arm member 32 intervenes between a rear proximal portion 13 of the box body 10 and the lid 20. The arm member 32 is disposed along the side wall portion, of the lid 20, formed on the vehicle rear side when the lid 20 is at the close position. The arm member 32 has almost the same longitudinal length as the width of the lid 20 in the left-right direction.

One end portion, of the arm member 32, in the left-right direction is supported by the rear proximal portion 13 of the box body 10 such that the arm member 32 is swingable. The other end portion, of the arm member 32, in the left-right direction is supported by the lid 20 such that the arm member 32 is swingable. The arm member 32 is swingable relative to the rear proximal portion 13 of the box body 10 about the first rotation shaft that extends in the front-rear direction, and swingable relative to the lid 20 about the second rotation shaft that extends in the front-rear direction. The arm member 32 has two through holes 32L and 32R. The through hole 32L is formed on the left side of the body of the arm member 32 and penetrates in the front-rear direction. The through hole 32R is formed on the right side of the body of the arm member 32 and penetrates in the front-rear direction.

The left side pivotal-support portion 33L is disposed on the left side of the arm member 32. The left side pivotal-support portion 33L forms the first rotation shaft described above, and opens and closes the lid 20 by pivoting the lid 20 about the first rotation shaft (that is, right-side opening and closing). The left side pivotal-support portion 33L includes a shaft 34L, an arm spring 35L, a tubular portion 36L, and a damper 37L.

The shaft 34L is formed in a column-like shape. The shaft 34L is inserted in the left side through hole 32L from the front left side of the arm member 32 in the rear direction. The front end side portion of the shaft 34L is fixed to the arm member 32. The rear end side portion of the shaft 34L projects from an opening, on the rear side, of the through hole 32L in the vehicle rear direction. A support member 13L is disposed in the rear proximal portion 13 of the box body 10. The support member 13L has a support hole 13La that penetrates in the axial direction. The rear end side portion of the shaft 34L is inserted in the support hole 13La of the rear proximal portion 13, and is supported so as to be rotatable relative to the support member 13L of the rear proximal portion 13 of the box body 10. The shaft 34L extends in the front-rear direction along the left-side long side 11a of the peripheral edge of the opening 11. The shaft 34L forms the first rotation shaft. The arm member 32 is swingable relative to the rear proximal portion 13 of the box body 10 by the shaft 34L.

The arm spring 35L is wound around the shaft 34L. The arm spring 35L is a torsion spring that generates an urging force for swinging the arm member 32 relative to the rear proximal portion 13 of the box body 10. The urging force of the arm spring 35L is maximum when the lid 20 is at the closed position, and is minimum when the lid 20 is at the right side fully-opened position. One end of the arm spring 35L is fixed to the arm member 32. The other end of the arm spring 35L is fixed to the rear proximal portion 13 of the box body 10.

The tubular portion 36L is fitted onto the outer side of the shaft 34L. The tubular portion 36L is formed in a tubular shape so as to be hollow and coaxial with the shaft 34L. The tubular portion 36L is disposed so as to be integrated with the rear end side portion of the shaft 34L. The shaft 34L and the tubular portion 36L are integrated to form a shaft member. The tubular portion 36L rotates integrally with the shaft 34L according to rotation of the shaft 34L. The tubular portion 36L has external teeth 36La. A plurality of the external teeth 36La are aligned along the outer circumference of the tubular portion 36L.

The damper 37L is an attenuating device that reduces a swinging speed when the arm member 32 is swung relative to the rear proximal portion 13 of the box body 10 (that is, when the right side portion of the lid 20 is opened). The damper 37L is formed in a cylindrical shape. The damper 37L is mounted and fixed to the rear proximal portion 13 of the box body 10. The damper 37L has external teeth 37La. A plurality of the external teeth 37La are aligned along the outer circumference of the damper 37L. The external teeth 37La of the damper 37L and the external teeth 36La of the tubular portion 36L mesh with each other. The damper 37L applies an attenuating force for reducing the above-described swinging speed, through the tubular portion 36L, to the shaft 34L.

The right side pivotal-support portion 33R is disposed on the right side of the arm member 32. The right side pivotal-support portion 33R forms the second rotation shaft described above, and opens and closes the lid 20 by pivoting the lid 20 about the second rotation shaft (that is, left-side opening and closing). The right side pivotal-support portion 33R includes a shaft 34R, an arm spring 35R, a tubular portion 36R, and a damper 37R.

Figure 9:
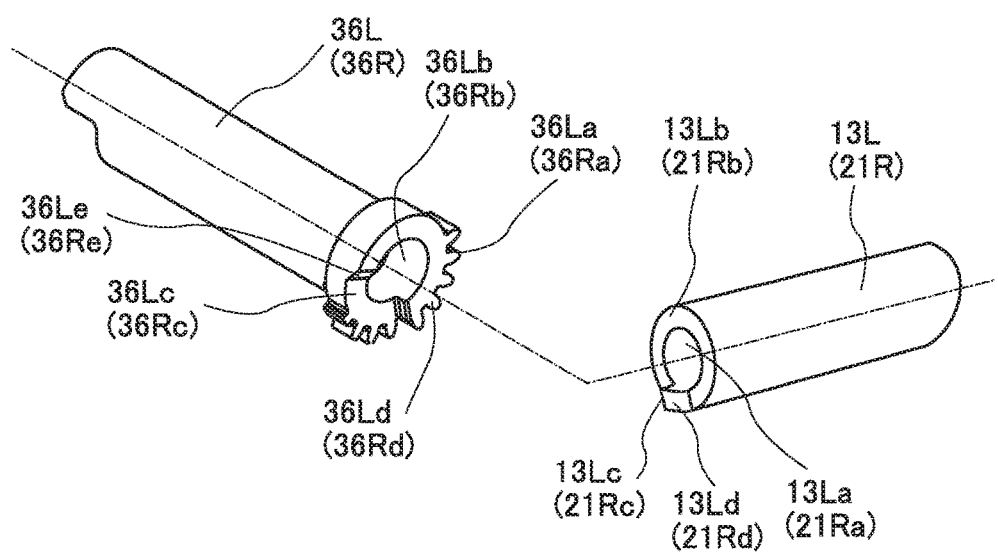
FIG. 9 is a perspective view of a shaft member and a support member of the opening and closing mechanism of the double opening storage device according to the present embodiment.

The shaft 34R is a collar formed in a cylindrical shape. The shaft 34R is inserted in the right side through hole 32R from the rear right side of the arm member 32 in the front direction. The rear end side portion of the shaft 34R is fixed to the arm member 32. The front end side portion of the shaft 34R projects from an opening, on the front side, of through hole 32R in the vehicle front direction. The lower lid member 21 of the lid 20 has a support member 21R which has almost the same shape and function as the support member 13L of the rear proximal portion 13 of the box body 10, as shown in FIG. 9. The support member 21R has a support hole 21Ra that penetrates in the axial direction. The front end side portion of the shaft 34R is inserted in the support hole 21Ra of the lid 20, and is supported so as to be rotatable relative to the support member 21R of the lid 20. The shaft 34R extends in the front-rear direction along the right-side long side 11a of the peripheral edge of the opening 11. The shaft 34R forms the second rotation shaft. The arm member 32 is swingable relative to the lid 20 by the shaft 34R.

The arm spring 35R is wound around the shaft 34R. The arm spring 35R is a torsion spring that generates an urging force for swinging the arm member 32 relative to the lid 20. An urging force of the arm spring 35R is maximum when the lid 20 is at the closed position, and is minimum when the lid 20 is at the left side fully-opened position. One end of the arm spring 35R is fixed to the arm member 32. The other end of the arm spring 35R is fixed to the lower lid member 21 of the lid 20.

The tubular portion 36R is fitted onto the outer side of the shaft 34R. The tubular portion 36R is formed in a tubular shape so as to be hollow and coaxial with the shaft 34R. The tubular portion 36R is disposed so as to be integrated with the front end side portion of the shaft 34R. The shaft 34R and the tubular portion 36R are integrated to form a shaft member. The tubular portion 36R rotates integrally with the shaft 34R according to rotation of the shaft 34R. The tubular portion 36R has external teeth 36Ra. A plurality of the external teeth 36Ra are aligned along the outer circumference of the tubular portion 36R.

The damper 37R is an attenuating device that reduces a swinging speed when the arm member 32 is swung relative to the lid 20 (that is, when the left side portion of the lid 20 is opened). The damper 37R is formed in a cylindrical shape. The damper 37R is mounted and fixed to the lower lid member 21 of the lid 20. The damper 37R has external teeth 37Ra. A plurality of the external teeth 37Ra are aligned along the outer circumference of the damper 37R. The external teeth 37Ra of the damper 37R and the external teeth 36Ra of the tubular portion 36R mesh with each other. The damper 37R applies an attenuating force for reducing the above-described swinging speed, through the tubular portion 36R, to the shaft 34R.

The opening and closing mechanism 30 has a locking unit 39. The locking unit 39 is a device for holding at least one side portion of the left side portion and the right side portion of the lid 20 at the closed position relative to the box body 10, and canceling the holding of the other side portion at the closed position in a state where the one side portion is held at the closed position relative to the box body 10.

The locking unit 39 includes a left side locking device 40 and a right side locking device 50. The left side locking device 40 is disposed on the left side of the lid 20. The left side locking device 40 holds the left side portion of the lid 20 at the closed position, and cancels the holding of the left side portion of the lid 20 at the closed position. Meanwhile, the right side locking device 50 is disposed on the right side of the lid 20. The right side locking device 50 holds the right side portion of the lid 20 at the closed position, and cancels the holding of the right side portion of the lid 20 at the closed position.

The left side locking device 40 includes a first left side rod 41, a second left side rod 42, a left side synchronizing device 43, a left side rod urging member 44, and a left side operation portion 45. The first left side rod 41 is a rod member that is disposed on the rear portion side of the lid 20 and extends in almost the front-rear direction. The second left side rod 42 is a rod member that is disposed on the front portion side of the lid 20 and extends in the front-rear direction. The first left side rod 41 and the second left side rod 42 are each supported so as to advance and retract relative to the lid 20 in the front-rear direction.

The first left side rod 41 is movable forward and backward so as to shift between a state where the rear end portion of the first left side rod 41 projects rearward of the rear end of the body portion of the lid 20 and a state where the rear end portion of the first left side rod 41 is retracted into the body portion of the lid 20. An engagement hole 32a into which the first left side rod 41 is inserted and engaged is formed in the front surface of the arm member 32. The rear end portion of the first left side rod 41 engages with the arm member 32 when the rear end portion of the first left side rod 41 projects rearward of the rear end of the body portion of the lid 20.

The second left side rod 42 is movable forward and backward so as to shift between a state where the front end portion of the second left side rod 42 projects forward of the front end of the body portion of the lid 20 and a state where the front end portion of the second left side rod 42 is retracted into the body portion of the lid 20. An engagement hole 14a into which the second left side rod 42 is inserted and engaged is formed in the rear surface of a front proximal portion 14 of the box body 10. The front end portion of the second left side rod 42 engages with the front proximal portion 14 of the box body 10 when the front end portion of the second left side rod 42 projects forward of the front end of the body portion of the lid 20. The second left side rod 42 acts as the first rotation shaft in a state where the second left side rod 42 engages with the front proximal portion 14.

The left side synchronizing device 43 is disposed between the first left side rod 41 and the second left side rod 42. The left side synchronizing device 43 moves the first left side rod 41 and the second left side rod 42 in synchronization with each other so as to be close to each other or distant from each other. The left side synchronizing device 43 is a disk-shaped rotary member that is rotatably supported by the lower lid member 21 of the lid 20. The front end portion of the first left side rod 41 is rotatably supported on the right side of the left side synchronizing device 43. The rear end portion of the second left side rod 42 is rotatably supported on the left side of the left side synchronizing device 43. A support point of the first left side rod 41 and a support point of the second left side rod 42 are distant from each other in the circumferential direction by almost 180° in the left side synchronizing device 43, and are almost symmetric about the rotation center of the left side synchronizing device 43.

The left side rod urging member 44 is a helical spring that generates an urging force for urging the second left side rod 42 forward relative to the lid 20. One end of the left side rod urging member 44 is fixed to the second left side rod 42. The other end of the left side rod urging member 44 is fixed to the lower lid member 21 of the lid 20. An urging force of the left side rod urging member 44 is for rotating, through the second left side rod 42, the left side synchronizing device 43 clockwise (rightward) as viewed from the upper side. Thus, the urging force of the left side rod urging member 44 is a force for urging the first left side rod 41 rearward relative to the lid 20.

The left side operation portion 45 is disposed on the left side of the front proximal portion 14 of the box body 10. The left side operation portion 45 includes a button portion 45a and a mechanism portion 45b. The button portion 45a is disposed on the left side wall of the front proximal portion 14. The button portion 45a is urged leftward with respect to the front proximal portion 14 by a spring (not shown), and held so as to be flush with and along the left side wall of the front proximal portion 14 in a state where an operator does not press the button portion 45a rightward. The button portion 45a is movable rightward with respect to the front proximal portion 14 against an urging force of the spring by the button portion 45a being pressed by an operator.

The mechanism portion 45b is a mechanism for engaging the button portion 45a and the second left side rod 42 with each other. The mechanism portion 45b does not contact with the front end of the second left side rod 42 in a state where the button portion 45a is not pressed rightward, that is, in a state where the button portion 45a is flush with and along the left side wall of the front proximal portion 14. Meanwhile, when the button portion 45a is pressed rightward, the mechanism portion 45b contacts with the front end of the second left side rod 42, and moves the second left side rod 42 rearward against an urging force of the left side rod urging member 44 so as to retract the second left side rod 42 into the lid 20. When the second left side rod 42 is moved rearward, the left side synchronizing device 43 rotates leftward, whereby the first left side rod 41 moves forward.

When the lid 20 is in a closed state and the button portion 45a of the left side operation portion 45 is not pressed rightward, and when the lid 20 is in a right side opened state, the front end portion of the second left side rod 42 projects forward of the front end of the body portion of the lid 20, and engages with the front proximal portion 14 of the box body 10. At this time, the rear end portion of the first left side rod 41 projects rearward of the rear end of the body portion of the lid 20, and engages with the arm member 32. Hereinafter, this state is referred to as left locking state.

When the button portion 45a of the left side operation portion 45 is pressed rightward in the left locking state, and when the lid 20 is in a left-side opened state, the front end portion of the second left side rod 42 is positioned rearward of the front end of the body portion of the lid 20 and retracted into the lid 20, whereby engagement between the second left side rod 42 and the front proximal portion 14 is canceled. At this time, by the left side synchronizing device 43 being rotated leftward, the rear end portion of the first left side rod 41 is positioned forward of the rear end of the body portion of the lid 20 and retracted in the lid 20, whereby engagement between the first left side rod 41 and the arm member 32 is canceled. Hereinafter, this state is referred to as left-locking cancellation state.

The right side locking device 50 includes a first right side rod 51, a second right side rod 52, a right side synchronizing device 53, a right side rod urging member 54, and a right side operation portion 55. The first right side rod 51 is a rod member that is disposed on the rear portion side of the lid 20 and extends in almost the front-rear direction. The second right side rod 52 is a rod member that is disposed on the front portion side of the lid 20 and extends in the front-rear direction. The first right side rod 51 and the second right side rod 52 are each supported so as to advance and retract relative to the lid 20 in the front-rear direction.

The rear end portion of the first right side rod 51 is inserted in a through hole 34Ra that is formed at the center of the shaft 34R of the right side pivotal-support portion 33R. The first right side rod 51 is movable forward and backward so as to shift between a state where the rear end portion of the first right side rod 51 projects rearward of the rear end of the body portion of the lid 20, further, rearward of the rear end of the arm member 32, and a state where the rear end portion of the first right side rod 51 is retracted into the arm member 32. An engagement hole 13a into which the first right side rod 51 is inserted and engaged is formed in the front surface of the rear proximal portion 13 of the box body 10. The rear end portion of the first right side rod 51 engages with the rear proximal portion 13 of the box body 10 when the rear end portion of the first right side rod 51 projects rearward of the rear end of the arm member 32.

The second right side rod 52 is movable forward and rearward so as to shift between a state where the front end portion of the second right side rod 52 projects forward of the front end of the body portion of the lid 20 and a state where the front end portion of the second right side rod 52 is retracted into the body portion of the lid 20. An engagement hole 14b into which the second right side rod 52 is inserted and engaged is formed in the rear surface of the front proximal portion 14 of the box body 10. The front end portion of the second right side rod 52 engages with the front proximal portion 14 of the box body 10 when the front end portion of the second right side rod 52 projects forward of the front end of the body portion of the lid 20. The second right side rod 52 acts as the second rotation shaft in a state where the second right side rod 52 engages with the front proximal portion 14.

The right side synchronizing device 53 is disposed between the first right side rod 51 and the second right side rod 52. The right side synchronizing device 53 moves the first right side rod 51 and the second right side rod 52 in synchronization with each other so as to be close to each other or distant from each other. The right side synchronizing device 53 is a disk-shaped rotary member that is rotatably supported by the lower lid member 21 of the lid 20. The front end portion of the first right side rod 51 is rotatably supported on the left side of the right side synchronizing device 53. The rear end portion of the second right side rod 52 is rotatably supported on the right side of the right side synchronizing device 53. A support point of the first right side rod 51 and a support potion of the second right side rod 52 are distant from each other in the circumferential direction by almost 180° in the right side synchronizing device 53, and are almost symmetric about the rotation center of the right side synchronizing device 53.

The right side rod urging member 54 is a helical spring that generates an urging force for urging the second right side rod 52 forward relative to the lid 20. One end of the right side rod urging member 54 is fixed to the second right side rod 52. The other end of the right side rod urging member 54 is fixed to the lower lid member 21 of the lid 20. An urging force of the right side rod urging member 54 is for rotating, through the second right side rod 52, the right side synchronizing device 53 counterclockwise (leftward) as viewed from the upper side. Thus, the urging force of the right side rod urging member 54 is a force for urging the first right side rod 51 rearward relative to the lid 20.

The right side operation portion 55 is disposed on the right side of the front proximal portion 14 of the box body 10. The right side operation portion 55 includes a button portion 55a and a mechanism portion 55b. The button portion 55a is disposed on the right side wall of the front proximal portion 14. The button portion 55a is urged rightward with respect to the front proximal portion 14 by a spring (not shown), and held so as to be flush with and along the right side wall of the front proximal portion 14 in a state where an operator does not press the button portion 55a leftward. The button portion 55a is movable leftward with respect to the front proximal portion 14 against an urging force of the spring by the button portion 55a being pressed by an operator.

The mechanism portion 55b is a mechanism for engaging the button portion 55a and the second right side rod 52 with each other. The mechanism portion 55b does not contact with the front end of the second right side rod 52 in a state where the button portion 55a is not pressed leftward, that is, in a state where the button portion 55a is flush with and along the right side wall of the front proximal portion 14. Meanwhile, when the button portion 55a is pressed leftward, the mechanism portion 55b contacts with the front end of the second right side rod 52, and moves the second right side rod 52 rearward against an urging force of the right side rod urging member 54 so as to retract the second right side rod 52 into the lid 20. When the second right side rod 52 is moved rearward, the right side synchronizing device 53 rotates rightward, whereby the first right side rod 51 moves forward.

When the lid 20 is in a closed state and the button portion 55a of the right side operation portion 55 is not pressed leftward, and when the lid 20 is in a left-side opened state, the front end portion of the second right side rod 52 projects forward of the front end of the body portion of the lid 20, and engages with the front proximal portion 14 of the box body 10. At this time, the rear end portion of the first right side rod 51 projects rearward of the rear end of the arm member 32, and engages with the rear proximal portion 13 of the box body 10 through the arm member 32. Hereinafter, this state is referred to as right locking state.

When the button portion 55a of the right side operation portion 55 is pressed leftward in the right locking state, and when the lid 20 is in a right side opened state, the front end portion of the second right side rod 52 is positioned rearward of the front end of the body portion of the lid 20 and retracted into the lid 20, whereby engagement between the second right side rod 52 and the front proximal portion 14 is cancelled. At this time, by the right side synchronizing device 53 being rotated rightward, the rear end portion of the first right side rod 51 is positioned forward of the rear end of the arm member 32 and retracted into the arm member 32, whereby engagement between the first right side rod 51 and the rear proximal portion 13 is canceled. Hereinafter, this state is referred to as right-locking cancellation state.

The locking unit 39 further includes a transmission rod 60. The transmission rod 60 is a member for preventing, when one of the left side locking device 40 and the right side locking device 50 is in a locking cancellation state, the other of the left side locking device 40 and the right side locking device 50 from shifting from the locking state to the locking cancellation state. The transmission rod 60 extends in the left-right direction. The transmission rod 60 is supported so as to be movable, in the left-right direction, along a guide 61 disposed in the lower lid member 21 of the lid 20.

A right end portion of the transmission rod 60 is supported by a front portion of the right side synchronizing device 53. The transmission rod 60 moves rightward by rightward rotation of the right side synchronizing device 53 when the second right side rod 52 moves rearward and the first right side rod 51 moves forward. Thereafter, when the second right side rod 52 moves forward and the first right side rod 51 moves rearward, the transmission rod 60 moves leftward by leftward rotation of the right side synchronizing device 53.

A left end portion of the transmission rod 60 is a free end. An engagement hole 62 is formed on the left end side of the transmission rod 60. The engagement hole 62 penetrates through the transmission rod 60 in the front-rear direction. An engaging projection 42a provided in the second left side rod 42 engages with the engagement hole 62. When the lid 20 is in the closed state (that is, the left locking state and the right locking state), the engaging projection 42a does not engage with the engagement hole 62. At this time, the engaging projection 42a opposes the engagement hole 62 in front of the engagement hole 62.

Meanwhile, in the left-locking cancellation state, the second left side rod 42 moves rearward, whereby the engaging projection 42a engages with the engagement hole 62. In this engagement state, movement of the transmission rod 60 in the left-right direction is regulated. Therefore, movement of the first and the second right side rods 51 and 52 in the front-rear direction is regulated, and the right side locking device 50 is prevented from being in the right-locking cancellation state. In the right-locking cancellation state, the second right side rod 52 moves rearward, whereby the transmission rod 60 moves rightward, and the engaging projection 42a opposes, at the front position, an end portion 60a adjacent to the left side of the engagement hole 62 of the transmission rod 60. In this opposing state, the engaging projection 42a contacts with the end portion 60a of the transmission rod 60, whereby movement of the first and the second left side rods 41 and 42 in the front-rear direction is regulated, whereby the left side locking device 40 is prevented from being in the left-locking cancellation state.

The opening and closing mechanism 30 further includes a flap device 70. The flap device 70 includes a left side flap device 71 and a right side flap device 72. The left side flap device 71 is disposed in the front left portion of the lid 20. The left side flap device 71 engages with the left side locking device 40. The left side flap device 71 holds the left side locking device 40 in the left-locking cancellation state when the lid 20 is in the left-side opened state, that is, in the right locking state and the left-locking cancellation state. The right side flap device 72 is disposed in the front right portion of the lid 20. The right side flap device 72 engages with the right side locking device 50. The right side flap device 72 holds the right side locking device 50 in the right-locking cancellation state when the lid 20 is in the right side opened state, that is, in the left locking state and the right-locking cancellation state.

Next, an operation of the double opening storage device 1 will be described.

In the double opening storage device 1, when the lid 20 is in the closed state, the second left side rod 42 projects forward of the front end of the body portion of the lid 20, the first left side rod 41 projects rearward of the rear end of the body portion of the lid 20, the second right side rod 52 projects forward of the front end of the body portion of the lid 20, and the first right side rod 51 projects rearward of the rear end of the body portion of the lid 20 and further projects rearward of the rear end of the arm member 32. In this case, the first left side rod 41 arranged in the lid 20 engages with the arm member 32, the second left side rod 42 and the second right side rod 52 engage with the front proximal portion 14 of the box body 10, and the first right side rod 51 engages with the rear proximal portion 13 of the box body 10 through the arm member 32, whereby the lid 20 is held in the closed state in which the lid 20 closes the opening 11 of the box body 10.

In a case where the button portion 45a of the left side operation portion 45 is pushed rightward when the lid 20 is in the close state, the mechanism portion 45b contacts with the front end of the second left side rod 42, to move the second left side rod 42 rearward. By the second left side rod 42 being moved rearward, the left side synchronizing device 43 rotates leftward. Thus, the first left side rod 41 moves forward. The second left side rod 42 is moved rearward until engagement with the front proximal portion 14 of the box body 10 is canceled, and the first left side rod 41 is moved forward until engagement with the arm member 32 is canceled, whereby the left side locking device 40 enters the left-locking cancellation state in a state where the first and the second right side rods 51 and 52 engage with the box body 10 (that is, the right locking state of the right side locking device 50). In this case, while the right side portion of the lid 20 is held in the closed state, holding of the left side portion of the lid 20 in the closed state is canceled.

The left side locking device 40 is advantageously structured such that engagement between the second left side rod 42 and the front proximal portion 14 of the box body 10 and engagement between the first left side rod 41 and the arm member 32 are canceled at almost the same time.

Figure 12:
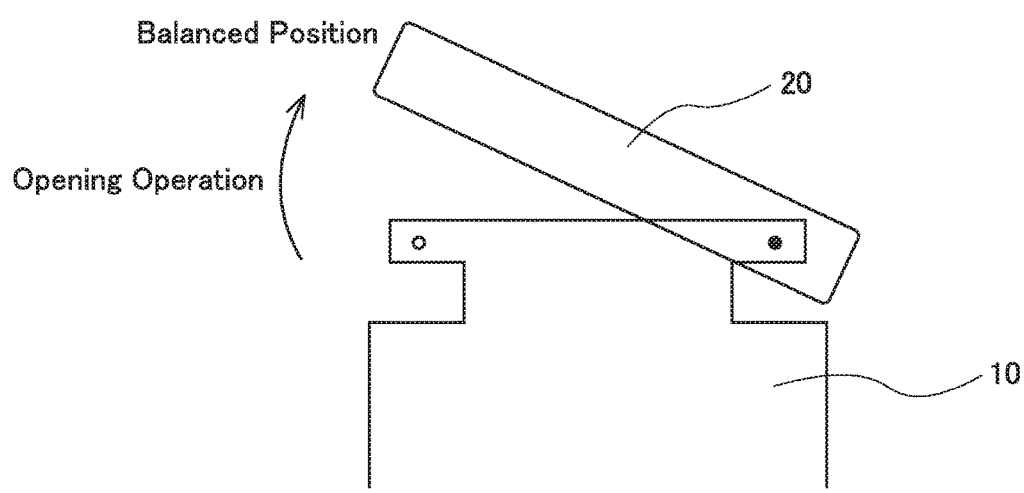
FIG. 12 is a front view of the lid, in the opened state, of the opening and closing mechanism of the double opening storage device according to the present embodiment.

When holding of the left side portion of the lid 20 in the closed state is canceled, the lid 20 swings relative to the arm member 32 due to an urging force of the arm spring 35R of the right side pivotal-support portion 33R. Meanwhile, when the right side portion of the lid 20 is held in the closed state, the arm member 32 does not swing relative to the rear proximal portion 13 of the box body 10. Therefore, in a case where the button portion 45a of the left side operation portion 45 is pressed rightward, the lid 20 rotates about the right side second rotation shaft relative to the arm member 32, eventually, the box body 10 in a state where the arm member 32 is integrated into the box body 10. Thus, the left side portion of the lid 20 is opened toward the opened position, and the left side opening operation is automatically performed up to the balanced position at which the weight of the lid 20 and the urging force of the arm spring 35R balance each other, as shown in FIG. 12.

After the left side opening operation has been performed up to the balanced position described above, the lid 20 is opened to the left side fully opened position by a manual operation of an operator. When the lid 20 has been opened to the left side fully opened position, further opening of the lid 20 is regulated by a stopper (not shown).

In a case where the button portion 55a of the right side operation portion 55 is pushed leftward when the lid 20 is in the closed state, the mechanism portion 55b contacts with the front end of the second right side rod 52, to move the second right side rod 52 rearward. By the second right side rod 52 being moved rearward, the right side synchronizing device 53 rotates rightward. Thus, the first right side rod 51 moves forward. The second right side rod 52 is moved rearward until engagement with the front proximal portion 14 of the box body 10 is canceled, and the first right side rod 51 is moved forward until engagement with the rear proximal portion 13 of the box body 10 is canceled, whereby the right side locking device 50 enters the right-locking cancellation state in a state where the first and the second left side rods 41 and 42 engage with the arm member 32 and the front proximal portion 14 of the box body 10 (that is, the left locking state of the left side locking device 40). In this case, the left side portion of the lid 20 is held in the closed state, and holding of the right side portion of the lid 20 in the closed state is canceled.

The right side locking device 50 is advantageously structured such that engagement between the second right side rod 52 and the front proximal portion 14 of the box body 10 and engagement between the first right side rod 51 and the rear proximal portion 13 of the box body 10 are canceled at almost the same time.

When holding of the right side portion of the lid 20 in the closed state is canceled, the arm member 32 swings relative to the rear proximal portion 13 of the box body 10 due to an urging force of the arm spring 35L of the left side pivotal-support portion 33L. Meanwhile, when the left side portion of the lid 20 is held in the closed state, the lid 20 does not swing relative to the arm member 32. Therefore, in a case where the button portion 55a of the right side operation portion 55 is pressed leftward, the lid 20 rotates about the left side first rotation shaft relative to the box body 10 in a state where the lid 20 is integrated into the arm member 32. Thus, the right side portion of the lid 20 is opened toward the opened position, and the right side opening operation is automatically performed up to the balanced position at which the weight of the lid 20 and an urging force of the arm spring 35L balance each other, as shown in FIG. 12.

After the right side opening operation has been performed up to the balanced position described above, the lid 20 is opened to the right side fully-opened position by a manual operation of an operator. When the lid 20 has been opened to the right side fully-opened position, further opening of the lid 20 is regulated by a stopper (not shown).

As described above, in the double opening storage device 1, the lid 20 is opened by pivoting about the right side second rotation shaft toward the left side opened position from the closed state in which the opening 11 of the box body 10 is closed, and is opened by pivoting about the left side first rotation shaft toward the right side opened position from the closed state in which the opening 11 of the box body 10 is closed. The lid 20 is opened and closed by one of the first rotation shaft or the second rotation shaft being selected as the rotation center.

In the double opening storage device 1, as shown in FIG. 7 and FIG. 8, the shaft 34L of the left side pivotal-support portion 33L which forms the first rotation shaft is inserted from the front left side into the arm member 32 in the rear direction. The rear end side portion of the shaft 34L is inserted in the support hole 13La of the support member 13L of the rear proximal portion 13 of the box body 10, and is supported so as to be rotatable relative to the rear proximal portion 13. The tubular portion 36L is fitted onto the outer side of the rear end side portion of the shaft 34L so as to be integrated and coaxial with the shaft 34L. The rear end side portion of the shaft 34L is inserted in the support hole 13La of the rear proximal portion 13 of the box body 10 in a state where the rear end side portion of the shaft 34L is inserted in a hollow hole 36Lb of the tubular portion 36L. The shaft 34L and the tubular portion 36L are fixed to the arm member 32, and, in the right side opening operation in which the lid 20 shifts from the closed state to the right side opened state (balanced position), the shaft 34L and the tubular portion 36L rotate relative to the rear proximal portion 13 of the box body 10 in an integrated manner according to the arm member 32 being swung.

As shown in FIG. 7 and FIG. 8, the shaft 34R of the right side pivotal-support portion 33R which forms the second rotation shaft is inserted from the rear right side into the arm member 32 in the front direction. The front end side portion of the shaft 34R is inserted in the support hole 21Ra of the support member 21R of the lid 20, and is supported so as to be rotatable relative to the lid 20. The tubular portion 36R is fitted onto the outer side of the front end side portion of the shaft 34R so as to be integrated and coaxial with the shaft 34R. The front end side portion of the shaft 34R is inserted in the support hole 21Ra of the lid 20 in a state where the front end side portion of the shaft 34R is inserted in a hollow hole 36Rb of the tubular portion 36R. The shaft 34R and the tubular portion 36R are fixed to the arm member 32, and, in the left side opening operation in which the lid 20 shifts from the closed state to the left side opened state (balanced position), the shaft 34R and the tubular portion 36R rotate relative to the lid 20 in an integrated manner according to the arm member 32 being swung.

Figure 10:
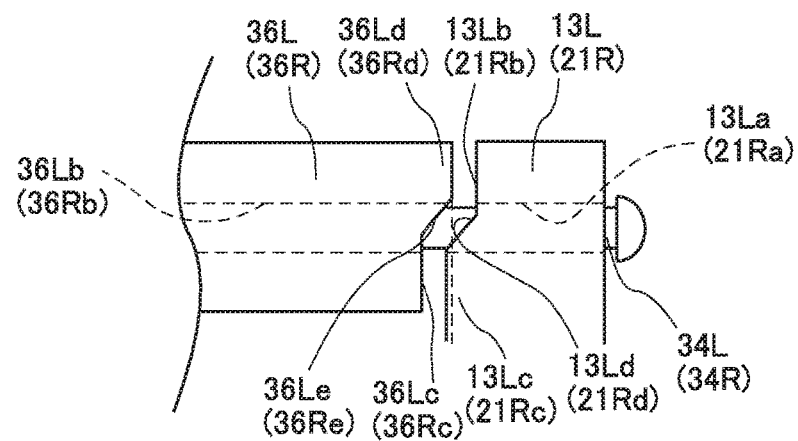
FIG. 10 is a side view illustrating a relationship, before interference, between the shaft member and the support member of the opening and closing mechanism shown in FIG. 9.
Figure 11:
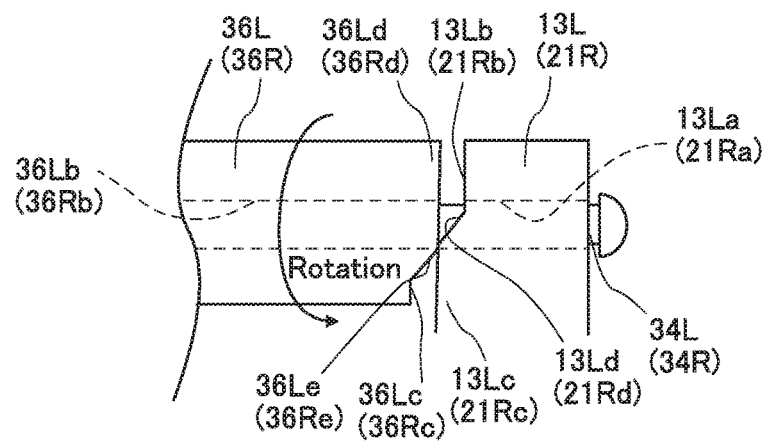
FIG. 11 is a side view illustrating a relationship, at the interference, between the shaft member and the support member of the opening and closing mechanism shown in FIG. 9.

The tubular portion 36L of the left side pivotal-support portion 33L has an axially rear end surface 36Lc at which the hollow hole 36Lb is open, as shown in FIG. 9, FIG. 10, and FIG. 11. The support member 13L of the rear proximal portion 13 of the box body 10 has an axially front end surface 13Lb at which the support hole 13La is open. The axially rear end surface 36Lc of the tubular portion 36L and the axially front end surface 13Lb of the support member 13L are spaced from each other over their entire areas when the lid 20 is in the closed state, and are opposing surfaces, respectively, which oppose each other.

The tubular portion 36L has a projection 36Ld. The projection 36Ld is a rib that projects outward (specifically, rearward) in the axial direction in the axially rear end surface 36Lc. The projection 36Ld is formed at a part of the axially rear end surface 36Lc around the hollow hole 36Lb. The projection 36Ld is disposed and formed so as not to contact with the axially front end surface 13Lb of the support member 13L of the box body 10 when the lid 20 is in the closed state. The projection 36Ld is formed so as to have a tilted surface 36Le that is tilted relative to the axial direction. The tilted surface 36Le is formed so as to gradually increase the projection in the direction opposite to the rotation direction in which the tubular portion 36L rotates relative to the rear proximal portion 13 of the box body 10 when the right side portion of the lid 20 is opened. The maximum projection of the projection 36Ld from the reference surface of the axially rear end surface 36Lc is set such that the projection 36Ld does not contact with the reference surface of the axially front end surface 13Lb of the support member 13L.

The support member 13L of the box body 10 has a projection 13Lc. The projection 13Lc is a rib that projects outward (specifically, forward) in the axial direction in the axially front end surface 13Lb. The projection 13Lc is formed at a part of the axially front end surface 13Lb around the support hole 13La. The projection 13Lc is disposed and formed so as not to contact with the axially rear end surface 36Lc of the tubular portion 36L when the lid 20 is in the closed state. The projection 13Lc is formed so as to have a tilted surface 13Ld that is tilted relative to the axial direction. The tilted surface 13Ld is formed so as to gradually increase the projection in the rotation direction in which the tubular portion 36L rotates relative to the rear proximal portion 13 of the box body 10 when the right side portion of the lid 20 is opened. The maximum projection of the projection 13Lc from the reference surface of the axially front end surface 13Lb is set such that the projection 13Lc does not contact with the reference surface of the axially rear end surface 36Lc of the tubular portion 36L.

The projection 36Ld of the tubular portion 36L and the projection 13Lc of the support member 13L are formed on the end surfaces 36Lc and 13Lb so as to project in the axial direction in which the projection 36Ld and the projection 13Lc are made close to each other The tubular portion 36L and the support member 13L are disposed such that the end surfaces 36Lc and 13Lb are spaced from each other in the axial direction and, further, the projections 36Ld and 13Lc do not interfere with each other, when the lid 20 is in the closed state. The projection 36Ld of the tubular portion 36L does not contact with the axially front end surface 13Lb of the support member 13L, and does not interfere with the projection 13Lc of the support member 13L when the lid 20 is in the closed state. The projection 13Lc of the support member 13L does not contact with the axially rear end surface 36Lc of the tubular portion 36L, and does not interfere with the projection 36Ld of the tubular portion 36L when the lid 20 is in the closed state.

The projection 36Ld of the tubular portion 36L and the projection 13Lc of the support member 13L are formed so as to overlap each other in the axial direction. Both the projections 36Ld and 13Lc strike each other and thus interfere with each other while the lid 20 is shifting from the closed state to the right side opened state. Both the projections 36Ld and 13Lc are formed so as to interfere with each other when the tubular portion 36L rotates relative to the support member 13L from the closed state of the lid 20 by a predetermined angle (for example, 10°), or when the lid 20 and the box body 10 are spaced from each other over a predetermined gap (for example, 5 cm). A distance over which both the projections 36Ld and 13Lc overlap each other may be any distance that allows generation of a force, in the axial direction, which is necessary and sufficient for regulating rotation of the tubular portion 36L and the support member 13L relative to each other in the interference state. Interference between both the projections 36Ld and 13Lc may be generated at a position immediately preceding a position at which the lid 20 is held in the right side opened state (balanced position).

When the projection 36Ld of the tubular portion 36L and the projection 13Lc of the support member 13L interfere with each other, both the projections 36Ld and 13Lc are deformed and distorted, and force in the axial direction is applied between the tubular portion 36L and the support member 13L to generate friction, whereby rotation of the tubular portion 36L and the support member 13L relative to each other is regulated. The tubular portion 36L and the support member 13L are less likely to rotate in a state where the projections 36Ld and 13Lc interfere with each other. Therefore, the lid 20 is held in the right side opened state and unstable holding of the lid 20 in the right side opened state due to an urging force of the arm spring 35L is avoided.

Similarly, the tubular portion 36R of the right side pivotal-support portion 33R has an axially front end surface 36Rc at which the hollow hole 36Rb is open, as shown in FIG. 9, FIG. 10, and FIG. 11. The support member 21R of the lid 20 has an axially rear end surface 21Rb at which the support hole 21Ra is open. The axially front end surface 36Rc of the tubular portion 36R and the axially rear end surface 21Rb of the support member 21R are spaced from each other over their entire areas when the lid 20 is in the closed state, and are opposing surfaces, respectively, which oppose each other.

The tubular portion 36R has a projection 36Rd. The projection 36Rd is a rib that projects outward (specifically, forward) in the axial direction in the axially front end surface 36Rc. The projection 36Rd is formed at a part of the axially front end surface 36Rc around the hollow hole 36Rb. The projection 36Rd is disposed and formed so as not to contact with the axially rear end surface 21Rb of the lid 20 when the lid 20 is in the closed state. The projection 36Rd is formed so as to have a tilted surface 36Re that is tilted relative to the axial direction. The tilted surface 36Re is formed so as to gradually increase the projection in the direction opposite to the rotation direction in which the tubular portion 36R rotates relative to the lid 20 when the left side portion of the lid 20 is opened. The maximum projection of the projection 36Rd from the reference surface of the axially front end surface 36Rc is set such that the projection 36Rd does not contact with the reference surface of the axially rear end surface 21Rb of the support member 21R.

The support member 21R of the lid 20 has a projection 21Rc. The projection 21Rc is a rib that projects outward (specifically, rearward) in the axial direction in the axially rear end surface 21Rb. The projection 21Rc is formed at a part of the axially rear end surface 21Rb around the support hole 21Ra. The projection 21Rc is disposed and formed so as not to contact with the axially front end surface 36Rc of the tubular portion 36R when the lid 20 is in the closed state. The projection 21Rc is formed so as to have a tilted surface 21Rd that is tilted relative to the axial direction. The tilted surface 21Rd is formed so as to gradually increase the projection in the rotation direction in which the tubular portion 36R rotates relative to the lid 20 when the left side portion of the lid 20 is opened. The maximum projection of the projection 21Rc from the reference surface of the axially rear end surface 21Rb is set such that the projection 21Rc does not contact with the reference surface of the axially front end surface 36Rc of the tubular portion 36R.

The projection 36Rd of the tubular portion 36R and the projection 21Rc of the support member 21R are formed on the end surfaces 36Rc and 21Rb so as to project in the axial direction in which the projection 36Rd and the projection 21Rc are made close to each other. The tubular portion 36R and the support member 21R are disposed such that the end surfaces 36Rc and 21Rb are spaced from each other in the axial direction, and, further, the projections 36Rd and 21Rc do not interfere with each other when the lid 20 is in the closed state. The projection 36Rd of the tubular portion 36R does not contact with the axially rear end surface 21Rb of the support member 21R, and does not interfere with the projection 21Rc of the support member 21R when the lid 20 is in the closed state. The projection 21Rc of the support member 21R does not contact with the axially front end surface 36Rc of the tubular portion 36R and does not interfere with the projection 36Rd of the tubular portion 36R when the lid 20 is in the closed state.

The projection 36Rd of the tubular portion 36R and the projection 21Rc of the support member 21R are formed so as to overlap each other in the axial direction. Both the projections 36Rd and 21Rc strike each other and thus interfere with each other while the lid 20 is shifting from the closed state to the left-side opened state. Both the projections 36Rd and 21Rc are formed so as to interfere with each other when the tubular portion 36R rotates relative to the support member 21R from the closed state of the lid 20 by a predetermined angle (for example, 10°), or when the lid 20 and the box body 10 are spaced from each other over a predetermined gap (for example, 5 cm). A distance over which both the projections 36Rd and 21Rc overlap each other may be any distance that allows generation of a force, in the axial direction, which is necessary and sufficient for regulating rotation of the tubular portion 36R and the support member 21R relative to each other in the interference state. Interference between both the projections 36Rd and 21Rc may be generated at a position immediately preceding a position at which the lid 20 is held in the left side opened state (balanced position).

When the projection 36Rd of the tubular portion 36R and the projection 21Rc of the support member 21R interfere with each other, both the projections 36Rd and 21Rc are deformed and distorted, and force in the axial direction is applied between the tubular portion 36R and the support member 21R to generate friction, whereby rotation of the tubular portion 36R and the support member 21R relative to each other is regulated. The tubular portion 36R and the support member 21R are less likely to rotate in a state where the projections 36Rd and 21Rc interfere with each other. Therefore, the lid 20 is held in the left-side opened state and unstable holding of the lid 20 in the left-side opened state due to an urging force of the arm spring 35R is avoided.

In a case where, after the lid 20 is held in the opened state due to interference between the projections 36Ld and 13Lc or interference between the projections 36Rd and 21Rc, the lid 20 shifts toward the fully opened position by manual operation of an operator, the interference between the projections 36Ld and 13Lc or the interference between the projections 36Rd and 21Rc may be canceled. Alternatively, the interference may be continuously maintained.

In order to rotate the tubular portion 36L and the support member 13L relative to each other when the lid 20 is held in the right side opened state in a state where the projections 36Ld and 13Lc interfere with each other as described above, a great force against friction between the projections 36Ld and 13Lc needs to be applied between the tubular portion 36L and the support member 13L. Similarly, in order to rotate the tubular portion 36R and the support member 21R relative to each other when the lid 20 is held in the left-side opened state in a state where the projections 36Rd and 21Rc interfere with each other, a great force against friction between the projections 36Rd and 21Rc needs to be applied between the tubular portion 36R and the support member 21R.

Thus, in the double opening storage device 1 of the present embodiment, the lid 20 is held in the opened state by using friction between the projection 36Ld, 36Rd of the tubular portion 36L, 36R and the projection 13Lc, 21Rc of the support member 13L, 21R. In this structure, in a case where the lid 20 is held in the opened state due to balance between the weight of the lid 20 and an urging force of the arm spring 35L, 35R when an operation of opening the lid 20 is performed, vibration of the lid 20 in the opening and closing direction around the first or the second rotation shaft due to influence of the arm spring 35L, 35R is inhibited. Even if external force is applied to the lid 20 due to, for example, vibration of a vehicle, when the external force does not exceed the above-described friction, and does not have a magnitude that is necessary for rotating the tubular portion 36L, 36R and the support member 13L, 21R relative to each other, the relative rotation does not occur. Therefore, vibration of the lid 20 in the opening and closing direction around the first or the second rotation shaft due to influence of the arm spring 35L, 35R is inhibited, and the lid 20 is continuously held in the opened state.

Therefore, in the double opening storage device 1, unlike a structure in which the lid 20 is held in the opened state due to only balance between the weight of the lid 20 and an urging force of the arm spring 35L, 35R, vibration of the lid 20 in the opening and closing direction around the first or the second rotation shaft due to an urging force of the arm spring 35L, 35R is inhibited when an operation of opening the lid 20 is performed or when the lid 20 is in the opened state, whereby the lid 20 is stably held in the opened state. Therefore, the quality of the lid 20 held in the opened state is improved.

When an operation of opening the lid 20 is performed, interference between the projections 36Ld and 13Lc and interference between the projections 36Rd and 21Rc are started by contact between the tilted surfaces 36Le and 13Ld and contact between the tilted surfaces 36Re and 21Rd. By the contact between the tilted surfaces 36Le and 13Ld or between the tilted surface 36Re and 21Rd, the impact at the contact is reduced, and friction between the projections 36Ld and 13Lc or friction between the projections 36Rd and 21Rc is increased according to the operation of opening the lid 20 being advanced after the contact. Therefore, in the operation of opening the lid 20, while the lid 20 is smoothly shifted to a position at which the lid 20 is held, the lid 20 is assuredly held at the holding position.

Furthermore, in order to stabilize the holding of the lid 20 in the right side opened state as described above, the shape of the end surface of the tubular portion 36L of the arm member 32 and the shape of the end surface of the support member 13L of the rear proximal portion 13 of the box body 10 may be any shapes that allow the projections 36Ld and 13Lc to project so as to be close to each other and interfere with each other. Similarly, in order to stabilize the holding of the lid 20 in the left-side opened state, the shape of the end surface of the tubular portion 36R of the arm member 32 and the shape of the end surface of the support member 21R of the lid 20 may be any shapes that allow the projections 36Rd and 21Rc to project so as to be close to each other and interfere with each other. Therefore, in the double opening storage device 1, the lid 20 is stably held in the opened state in a simple structure in a compact space without making a great design change or without using additional components.

In the above-described embodiment, the opening and closing mechanism 30 corresponds to "first opening and closing mechanism" and "second opening and closing mechanism" in claims. The shaft 34L and the tubular portion 36L which are integrated with each other or the shaft 34R and the tubular portion 36R which are integrated with each other correspond to "shaft member" in claims. The arm spring 35L, 35R corresponds to "urging member" in claims. The left side locking device 40 or the right side locking device 50 corresponds to "locking device" in claims.

In the above-described embodiment, the arm member 32 is disposed on the rear portion side of the box body 10. However, the present invention is not limited thereto. The arm member 32 may be disposed on the front portion side of the box body 10, or may be disposed on each of the rear portion side and the front portion side of the box body 10.

In the above-described embodiment, the projections 36Ld and 36Rd of the tubular portions 36L and 36R of the arm member 32, the projection 13Lc of the support member 13L of the rear proximal portion 13 of the box body 10, and the projection 21Rc of the support member 21R of the lid 20 are disposed on the end surfaces 36Lc, 36Rc, 13Lb, and 21Rb, respectively, in the axial direction and project in the axial direction. The axially rear end surface 36Lc of the tubular portion 36L and the axially front end surface 13Lb of the support member 13L are spaced from each other in the axial direction, and the projection 36Ld and the projection 13Lc project so as to be close to each other. The axially front end surface 36Rc of the tubular portion 36R and the axially rear end surface 21Rb of the support member 21R are spaced from each other in the axial direction, and the projection 36Rd and the projection 21Rc project so as to be close to each other.

However, the present invention is not limited thereto. The tubular portion 36L and the support member 13L may be formed and disposed such that the rear end portion of the tubular portion 36L is inserted in the support hole 13La, of the support member 13L, having an almost round cross-sectional shape, the projections 36Ld and 13Lc are each disposed on the side surface in the radial direction, and both the projections 36Ld and 13Lc project so as to be close to each other. Specifically, the projection 36Ld may be disposed on the outer surface, in the radial direction, of the rear end portion of the tubular portion 36L so as to project outward in the radial direction, and the projection 13Lc may be disposed on the inner surface, in the radial direction, in the support hole 13La of the support member 13L so as to project inward in the radial direction. Similarly, the tubular portion 36R and the support member 21R may be formed and disposed such that the rear end portion of the tubular portion 36R is inserted in the support hole 21Ra, of the support member 21R, having an almost round cross-sectional shape, the projections 36Rd and 21Rc are each disposed on the side surface in the radial direction, and both the projections 36Rd and 21Rc project so as to be close to each other.

Figure 13:
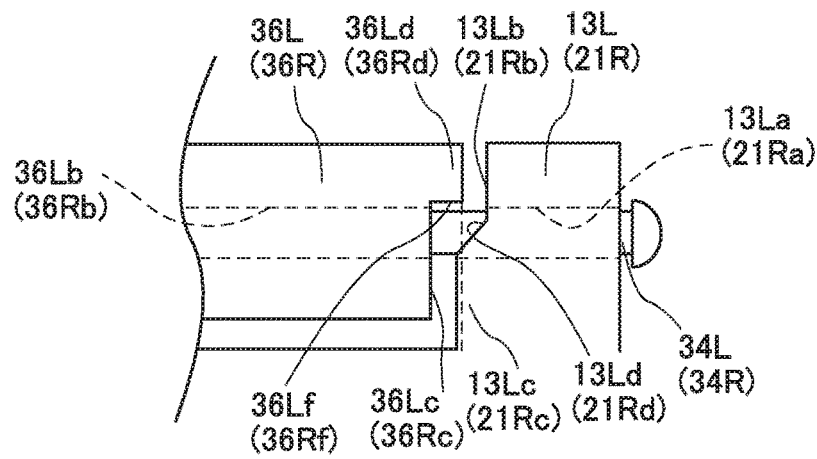
FIG. 13 is a side view illustrating a relationship, before interference, between a shaft member and a support member of an opening and closing mechanism of a double opening storage device according to modification of the present invention.

In the above-described embodiment, the projections 36Ld, 36Rd, 13Lc, and 21Rc have the tilted surfaces 36Le, 36Re, 13Ld, and 21Rd, respectively, which are tilted in the axial direction. However, the present invention is not limited thereto. When impact in the interference between the projection 36Ld of the tubular portion 36L of the left side pivotal-support portion 33L and the projection 13Lc of the support member 13L is to be reduced, at least one of the projections 36Ld and 13Lc may have a tilted surface. When impact in interference between the projection 36Rd of the tubular portion 36R of the right side pivotal-support portion 33R and the projection 21Rc of the support member 21R is to be reduced, at least one of the projections 36Rd and 21Rc may have a tilted surface. FIG. 13 shows a structure in which the projections 13Lc and 21Rc of the support members 13L and 21R have the tilted surfaces 13Ld and 21Rd that are tilted in the axial direction, and the projections 36Ld and 36Rd of the tubular portions 36L and 36R have circumferential end surfaces 36Lf and 36Rf that are perpendicular to the direction orthogonal to the axial direction.

In the above-described embodiment, when the projections 36Ld and 13Lc interfere with each other and the projections 36Rd and 21Rc interfere with each other, the projections 36Ld and 13Lc and the projections 36Rd and 21Rc are deformed and distorted, whereby force in the axial direction is applied between the tubular portion 36L and the support member 13L and between the tubular portion 36R and the support member 21R to generate friction. In order to improve durability of the projections 36Ld, 13Lc, 36Rd, and 21Rc while appropriate friction is generated during the interference, the tubular portion 36L, 36R or the support member 13L, 21R having a slit for elastically deforming the projection 36Ld, 13Lc, 36Rd, 21Rc during the interference is effectively used. The slits may be disposed in at least one of the two projections 36Ld and 13Lc which interference with each other and at least one of the two projections 36Rd and 21Rc which interfere with each other. However, the slit is advantageously disposed in a projection formed of a softer material from the viewpoint of easy elastic deformation. For example, in a case where the material of the tubular portion 36L, 36R is POM (polyacetal resin) and the material of the support member 13L, 21R is PAG (polyamide containing glass), the slid is preferably disposed in the tubular portion 36L, 36R.

Figure 14:
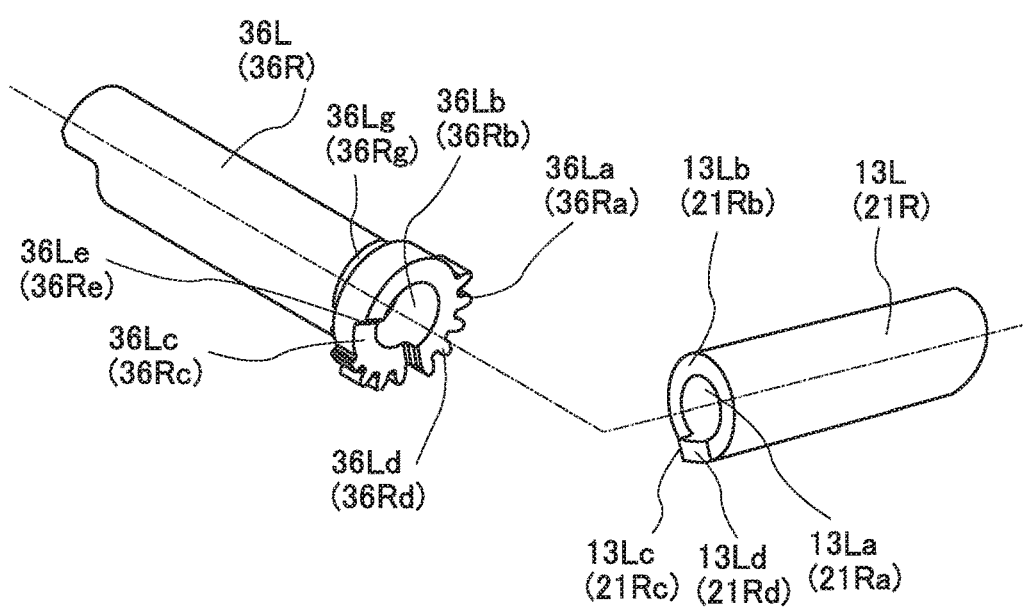
FIG. 14 is a perspective view of a shaft member and a support member of an opening and closing mechanism of a double opening storage device according to another modification of the present invention.
Figure 15:
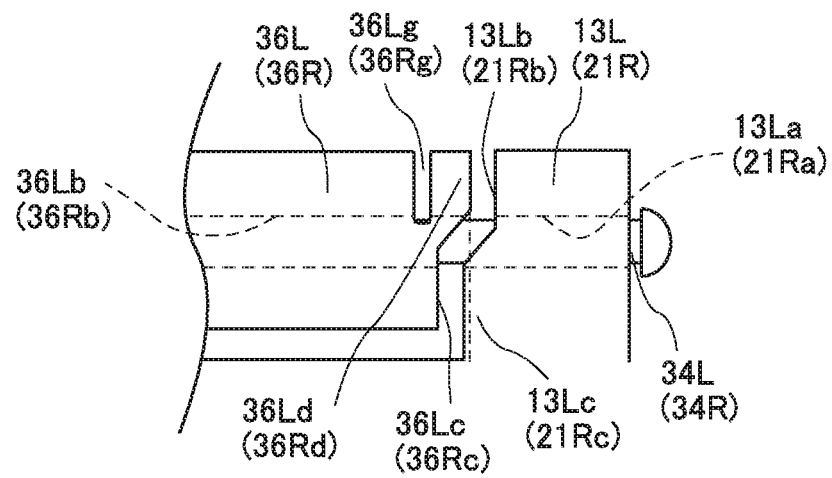
FIG. 15 is a side view illustrating a relationship, before interference, between the shaft member and the support member of the opening and closing mechanism shown in FIG. 14.
Figure 16:
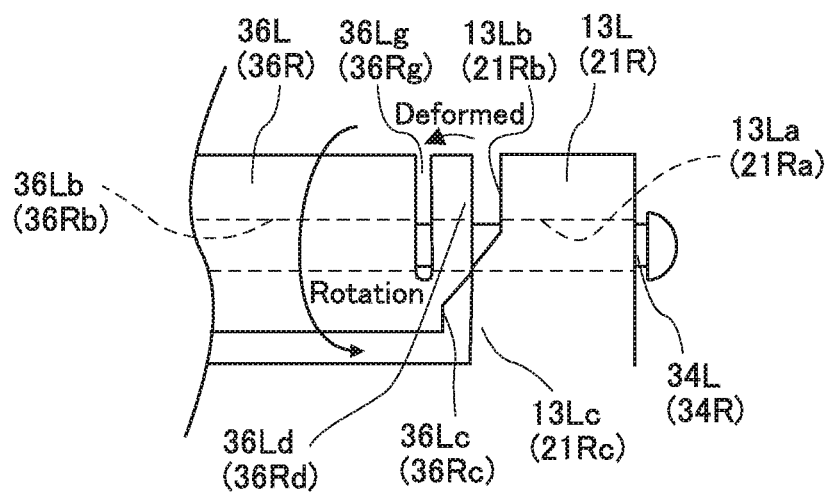
FIG. 16 is a side view illustrating a relationship, at interference, between the shaft member and the support member of the opening and closing mechanism shown in FIG. 14.

In FIG. 14, FIG. 15, and FIG. 16, a structure in which slits 36Lg and 36Rg are disposed in the tubular portions 36L and 36R, is shown. The slit 36Lg, 36Rg extends in the outer circumferential surface of the tubular portion 36L, 36R by a predetermined angle in the circumferential direction. The slit 36Lg, 36Rg is disposed adjacent to and inward of the projection 36Ld, 36Rd in the axial direction, among the entire circumferential region of the tubular portion 36L, 36R, such that the projection 36Ld, 36Rd is elastically deformed inward in the axial direction with ease. The above-described predetermined angle may be set according to an amount of deformation required for elastically deforming the projections 36Ld and 36Rd.

According to the modification, the projection 36Ld or the projection 36Rd is elastically deformed when the projections 36Ld and 13Lc interference with each other, or the projections 36Rd and 21Rc interference with each other, as shown in FIG. 16. Therefore, durability of the projections 36Ld, 13Lc, 36Rd, and 21Rc is improved while an appropriate force is generated between the tubular portion 36L and the support member 13L and between the tubular portion 36R and the support member 21R.

The present invention is not limited to the embodiments and modifications described above, and various changes may be made without departing from the gist of the present invention.

The invention claimed is:

1. A double opening storage device comprising:
a box body including a storage portion having an opening;
a lid configured to cover the opening so as to be openable and closable;
a first opening and closing mechanism configured to open and close the lid by pivoting the lid about a first rotation shaft that extends along a peripheral edge of the opening; and
a second opening and closing mechanism configured to open and close the lid by pivoting the lid about a second rotation shaft that extends along the peripheral edge of the opening, wherein
each of the first opening and closing mechanism and the second opening and closing mechanism includes
a shaft member disposed so as to be coaxial with the first rotation shaft or the second rotation shaft,
a support member configured to support the shaft member so as to rotate the shaft member about the first rotation shaft or the second rotation shaft,
an urging member configured to generate an urging force for rotating the shaft member relative to the support member in a direction in which the lid is opened, and
a locking device configured to hold the lid in a closed state against the urging force, and cancel, by an opening operation, holding of the lid in the closed state,
the shaft member and the support member include opposing surfaces, respectively, which are spaced from each other when the lid is in the closed state, and projections, respectively, which are disposed on the opposing surfaces and project so as to be close to each other, and
the projection of the shaft member and the projection of the support member do not interfere with each other when the lid is in the closed state, and interfere with each other while the lid is shifting from the closed state to a predetermined opened state.

2. The double opening storage device according to claim 1, wherein
the first opening and closing mechanism and the second opening and closing mechanism intervene between the box body and the lid, on a front side or a rear side of the box body, and the first opening and closing mechanism and the second opening and closing mechanism each have an arm member which has one end portion supported by the lid so as to be swingable, and has the other end portion supported by the box body so as to be swingable,
the shaft member is fixed to the arm member, and
the support member is disposed in the box body or the lid.

3. The double opening storage device according to claim 1, wherein the projections have, on the opposing surfaces, tilted surfaces that are tilted relative to a direction in which the shaft member and the support member are made close to each other.

4. The double opening storage device according to claim 1, wherein
the opposing surfaces are oriented in an axial direction, and
the projections project in the axial direction on the opposing surfaces.

* * * * *